Figure 1:
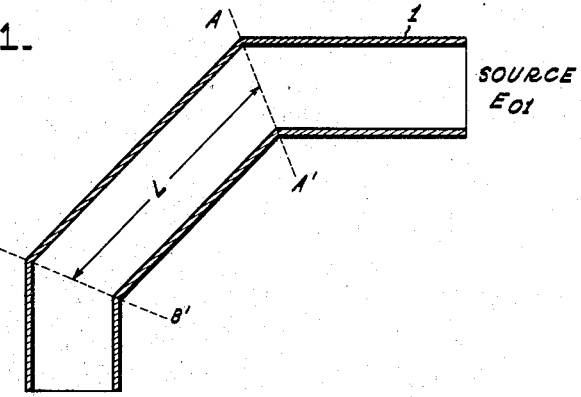

June 27, 1950   E. C. CORK ET AL   2,512,849
ELECTROMAGNETIC WAVE GUIDE
Filed April 30, 1945

INVENTORS.
EDWARD CECIL CORK,
MICHAEL BOWMAN-MANIFOLD
BY
ATTORNEY.

Patented June 27, 1950

2,512,849

UNITED STATES PATENT OFFICE 2,512,849

ELECTROMAGNETIC WAVE GUIDE

Edward Cecil Cork and Michael Bowman-Manifold, Ealing, London, England, assignors to Electric & Musical Industries Limited, Hayes, Middlesex, England Application April 30, 1945, Serial No. 591,028
In Great Britain August 14, 1942

Section 1, Public Law 690, August 8, 1946
Patent expires August 14, 1962

2 Claims. (Cl. 178—44)

This invention relates to wave guides for the propagation of electromagnetic waves.

In order to propagate electromagnetic waves along a wave guide the frequency of the waves should be greater than a certain critical value which is inversely proportional to the radius of the guide and to the square root of the dielectric coefficient of the dielectric within the guide. The expression "E wave" has been adopted as meaning a wave in a hollow conductor having both a longitudinal and a transverse component of electric field, but only a transverse component or components of magnetic field. The expression "H wave" has been adopted as meaning a wave in a hollow conductor having both a longitudinal and a transverse component of magnetic field, but only a transverse component or components of electric field. The expressions "E" and "H" usually carry subscripts which indicate the mode of vibration.

When a wave of a certain mode passes round a bend or angle in a guide the wave is distorted and there tend to be propagated forward and rearward travelling components of secondary waves of other modes. Some of these secondary waves will be propagated along the guide whilst others may only be attenuated depending on their critical frequencies in relation to the size of the guide.

When it is desired to propagate an $E_{01}$ wave and a bend or angle exists in the guide, it is found that in general the only other mode of importance which is propagated is the $H_{11}$ mode. Dependent upon the size of the guide it is also possible that $H_{21}$, $E_{11}$ and $H_{01}$ waves might propagate, but in practice these waves are rarely set up. It is not possible by suitably selecting the size of guide to exclude the $H_{11}$ waves in a waveguide designed for the propagation of $E_{01}$ waves and accordingly, it is the object of the present invention to provide a waveguide in which it is possible to eliminate substantially or wholly the forward travelling components of secondary waves which are set up when a wave of a desired mode passes round an angle or a bend in the guide.

The invention is based on the principle of controlling the generation of secondary waves in the angle or bend in such a way that the forward travelling components of said secondary waves substantially neutralise one another.

According to the invention a waveguide is provided having an angle or bend therein which causes the generation of secondary waves and wherein it is arranged that secondary waves are set up at a plurality of planes in the angle or bend in such a manner that the forward travelling components of said secondary waves substantially neutralise one another. Said secondary waves may be set up at two planes in the guide and the distance between these two planes so chosen that the forward travelling components of the secondary waves set up at the first of said planes arrive in antiphase to the forward travelling components of the secondary waves set up at the second plane so that said secondary waves substantially neutralise one another. It is also possible to employ an arcuate bend in the guide and by suitably choosing the radius of curvature of the arcuate portion as hereinafter referred to neutralisation of said forward travelling components can be effected. If desired, however, said forward travelling components set up by the angle or bend in the guide may be neutralised by inserting into the angle or bend auxiliary means, such as a plug or plugs, suitably disposed so as to set up further secondary waves which serve to neutralise the secondary waves set up by the angle or bend.

In order that the said invention may be clearly understood and readily carried into effect, it will now be more fully described with reference to the accompanying drawings in which Figures 1, 2 and 3 each illustrate a portion of a waveguide having an angle or bend embodying different forms of the invention.

Referring first to Figure 1 of the drawings, a waveguide 1 is shown of circular form in cross-section and intended for the propagation of an $E_{01}$ wave. The waveguide 1 comprises two portions disposed at an angle of 90°, these two portions being joined by an intermediate section as shown providing at the planes indicated by the dotted lines AA' and BB' bends of 135°. An $E_{01}$ wave incident at the plane AA' will generate an $H_{11}$ wave which will be in a certain phase relation to the incident $E_{01}$ wave. Similarly, an $H_{11}$ wave will be generated at the plane BB'. In each case there will be generated forward and rearward travelling components of secondary waves. In the intermediate section of the waveguide the $E_{01}$ and the $H_{11}$ waves will propagate with unequal phase velocities and by suitably choosing the length L between the two planes aforesaid it can be arranged that the forward travelling components of the $H_{11}$ wave generated at the plane AA' will lose half a period in phase relative to the $E_{01}$ wave and will arrive at the plane BB' in antiphase to the forward travelling components of the $H_{11}$ wave generated at the plane BB' and will thus substantially neutralise that wave. A minimum resultant component of the $H_{11}$ wave is thus propagated beyond the plane BB'. In order that such neutralisation can be effected the distance L should satisfy the following equation:

$$L = \frac{n - \frac{1}{2}}{\frac{1}{\lambda_1} - \frac{1}{\lambda_2}} \quad (1)$$

Where $\lambda_1$ is the wavelength within the guide of the $H_{11}$ wave and $\lambda_2$ is the wavelength within the guide of the $E_{01}$ wave and $n$ is any integer excluding 0.

Figure 2:
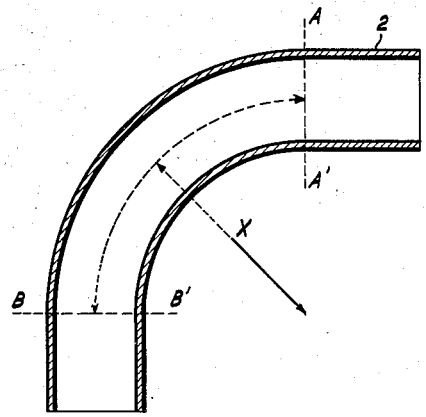

Figure 2 of the drawings illustrates a further embodiment of the invention in which the waveguide 2 consists of two portions disposed at an angle of 90° and joined by an intermediate section of arcuate form having a uniform radius and subtending an angle of 90°. In any transverse plane of this intermediate section the incident $E_{01}$ wave will generate an $H_{11}$ wave and in order that all forward travelling components of the secondary waves so generated will substantially neutralise one another it is necessary to arrange that the arc length is sufficiently long for the phase-amplitude diagram of said secondary waves to be a substantially complete circle so that all the forward travelling components of said secondary waves will add together to afford a substantially zero resultant, that is to say, the arc length between the planes AA' and BB' should be such that $$r = \frac{2n}{\pi \left( \frac{1}{\lambda_1} - \frac{1}{\lambda_2} \right)} \quad (2)$$

where $r$ is the mean radius of the intermediate arcuate section.

If the intermediate arcuate section does not subtend an angle of 90°, for example, in the case where the two lengths of waveguide are required to be disposed at an angle other than 90°, the arc length should be the same as in the case in which the intermediate section subtends an angle of 90°. Furthermore, if the curvature of the arcuate section is not uniform so that secondary waves of different amplitude are generated dependent on their planes of origin, it will be appreciated that it is still possible by choosing correctly the length of arcuate section to arrange that the phase-amplitude diagram of the secondary waves is a substantially complete loop so that the resultant of all the forward travelling components of the secondary waves is substantially zero.

Figure 3:
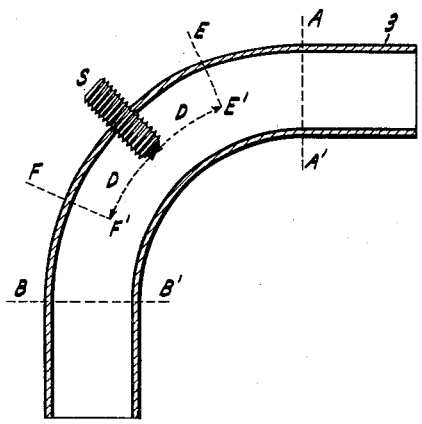

An alternative to the arrangements of Figures 1 and 2 is shown in Figure 3 in which neutralisation of the forward travelling components of the $H_{11}$ waves in the bend is accomplished by introducing the $H_{11}$ wave in opposite phase by means of an obstruction which will be placed at the midpoint of the bend. This figure shows a waveguide 3 having a bend similar to that of Figure 2, but in which a screw or plug S, which causes an $H_{11}$ wave to be generated is inserted in the plane of the midpoint and is intended to be adjusted empirically.

If the bend is unsymmetrical additional screws may be inserted along lines E, E' and F, F' so as to produce an $H_{11}$ wave which will be in quadrature with the wave produced by the screw S.

The requisite conditions are such that each distance D between the plane of the screw S and the planes indicated by the dotted lines E, E' and F, F' at which the additional screws are inserted and measured along an arc of mean radius shall satisfy the equation:

$$D = \frac{1}{4 \left( \frac{1}{\lambda_1} - \frac{1}{\lambda_2} \right)} \quad (3)$$

In practice the arrangements described may be combined. For example, a bend may be constructed to effect neutralisation as described with reference to Figure 2, and fine adjustment may be accomplished by the principle illustrated in and described with reference to Figure 3.

Although the invention has been described above as applied to a waveguide in which it is desired to propagate an $E_{01}$ wave and to neutralise an $H_{11}$ wave, it will be understood that the invention is capable of general application where the propagation of a desired wave causes at an angle or bend in a guide the propagation of secondary waves of undesired mode.

What we claim is:

1. In an electromagnetic wave guide for the propagation of high frequency energy of predetermined mode, said guide having an arcuate section along its length which causes the generation of secondary waves of undesired mode means associated with said guide for neutralizing said secondary waves, said means including a number of conductive inserts in said guide in the form of screw plugs inserted through the wall of said guide, said plugs being spaced apart a distance D along an arc of mean radius of curvature of said change in direction to satisfy the relation $$D = \frac{1}{4 \left( \frac{1}{\lambda_1} - \frac{1}{\lambda_2} \right)}$$

where $\lambda_1$ is the wavelength within the guide of the desired wave and $\lambda_2$ is the wavelength within the guide of the secondary wave.

2. In an electromagnetic waveguide for the propagation of a wave of predetermined mode having two portions arranged in angular relationship to each other wherein the transmission of energy from one of said portions to the other is normally accompanied by the generation of secondary waves of undesired mode, means to transmit said wave along said guide in said predetermined mode to the exclusion of said undesired mode, said means comprising a section of waveguide interposed between said portions at the same angular relationship with respect to each of said portions, said section having a conductive member interposed therein at a point intermediate the ends thereof to produce further secondary waves in phase opposition to the secondary waves produced at the junctions of said section and said portions whereby said waves of undesired mode are substantially neutralized.

EDWARD CECIL CORK.
MICHAEL BOWMAN-MANIFOLD.

REFERENCES CITED

The following references are of record in the file of this patent:

UNITED STATES PATENTS

| Number | Name | Date |
| --- | --- | --- |
| 2,129,712 | Southworth | Sept. 13, 1938 |
| 2,165,961 | Cork | July 11, 1939 |
| 2,250,934 | Ohl | July 29, 1941 |
| 2,281,274 | Dallenbach | Apr. 28, 1942 |
| 2,356,414 | Linder | Aug. 22, 1944 |
| 2,374,498 | Quayle | Apr. 24, 1945 |
| 2,396,044 | Fox | Mar. 5, 1946 |